(12) United States Patent
van der Blom

(10) Patent No.: US 6,314,985 B1
(45) Date of Patent: Nov. 13, 2001

(54) VALVE CONNECTOR

(75) Inventor: Nicolaas van der Blom, Birkerod (DK)

(73) Assignee: NVB International, Birkerod (DK)

( * ) Notice: Subject to any disclaimer, the term of this patent is extended or adjusted under 35 U.S.C. 154(b) by 0 days.

(21) Appl. No.: 08/837,505

(22) Filed: Apr. 18, 1997

Related U.S. Application Data

(63) Continuation-in-part of application No. PCT/DK96/00055, filed on Feb. 2, 1996.

(30) Foreign Application Priority Data

| Feb. 3, 1995 | (DK) | .................................................... 0125/95 |
| Sep. 12, 1995 | (GB) | .................................................... 9518558 |

(51) Int. Cl.$^7$ .................................................... F16K 15/20
(52) U.S. Cl. .......................................... 137/231; 137/223
(58) Field of Search .................................... 137/223, 231; 152/415; 251/149.4; 285/148.23

(56) References Cited

U.S. PATENT DOCUMENTS

| 1,492,838 | * | 5/1924 | Dilweg ............................ 137/231 X |
| 1,850,111 | | 3/1932 | Kelsey . |
| 2,025,067 | | 12/1935 | Miller . |
| 2,257,498 | * | 9/1941 | Hansen ................................. 137/231 |
| 2,489,397 | | 11/1949 | Brummer . |
| 2,685,906 | | 8/1954 | Williams . |

(List continued on next page.)

FOREIGN PATENT DOCUMENTS

| 25 44 555 | 7/1977 | (DE) . |
| 3819771 | 7/1989 | (DE) . |
| 196 01 952 A1 | 7/1997 | (DE) . |
| 0125/95 | 8/1996 | (DK) . |
| 0 240 660 | 10/1987 | (EP) . |
| 2 653 523 | 4/1991 | (FR) . |
| 231992 | 4/1925 | (GB) . |
| 872246 | 7/1961 | (GB) . |
| 977139 | 12/1964 | (GB) . |
| 1599304 | 9/1981 | (GB) . |
| 2304844 | 3/1997 | (GB) . |
| WO 84/02968 | 8/1984 | (WO) . |
| WO92/22448 | 12/1992 | (WO) . |
| WO 96/10903 | 4/1996 | (WO) . |
| WO 97/43570 | 11/1997 | (WO) . |

Primary Examiner—John Rivell
(74) Attorney, Agent, or Firm—Price and Gess

(57) ABSTRACT

By a universal valve connector for inflation valves of vehicle types (Sclaverand, Dunlop-Woods, or Schrader), whose connector consists of a connector housing (368), which partly is connected to a pressure source, preferably a hand or foot pump, and which partly has a coupling hold (5) with a diameter corresponding to the diameter of the valve, which is to be connected, where the coupling hole is equipped with a securing means for securing on the valve, plus a sealing means against valves of different sizes. This is achieved by the sealing means (366) being mounted coaxially in the connector housing (368) and being established on at least two parallel, separate levels, having the centre line (4) of the connector housing (368), which is coaxial to the centre line of the valve, as its normal, where the minor diameters of the sealing means approximately correspond to the major diameter of the current valve dimensions, on which the connector is mounted when used, that the sealing means (366), closest to the opening (8) of the coupling hole (5) in the connector housing (368) has the biggest minor diameter, while the sealing means (366) farthest from the opening (8) of the coupling hole in the connector housing (368) has the smallest minor diameter, and diameters between the extremes are lying corresponding separate distance between these extremes. The valve connector has the possibility of automatically adjust itself to the valve in question and if needed to activate the central core of a Schrader valve. Also, it is possible to use the connector with existing pumps.

1 Claim, 15 Drawing Sheets

U.S. PATENT DOCUMENTS

Figure 1:
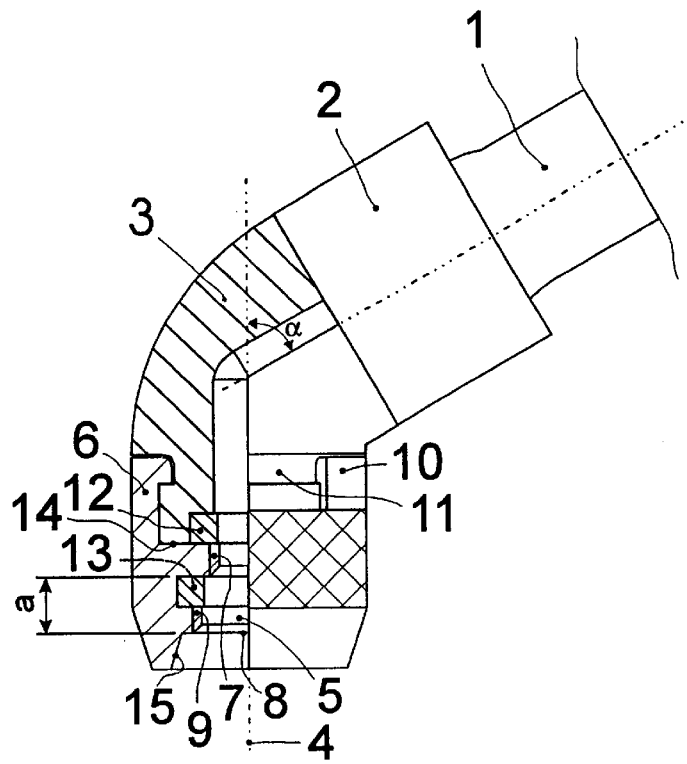

| | | | |
|---|---|---|---|
| 2,716,998 | * | 9/1955 | Knasko ................................. 137/231 |
| 2,976,906 | | 3/1961 | Kamm et al. . |
| 3,249,144 | | 5/1966 | Dobrikin . |
| 3,926,205 | * | 12/1975 | Gourlet ................................. 137/223 |
| 4,088,147 | * | 5/1978 | Krechel et al. ....................... 137/223 |
| 4,165,760 | | 8/1979 | Guenthler . |
| 4,489,855 | | 12/1984 | Boetger . |
| 4,611,828 | * | 9/1986 | Brunet ............................... 152/415 X |
| 4,662,412 | | 5/1987 | Swallert . |
| 4,712,812 | * | 12/1987 | Weir, III ......................... 285/148.23 |
| 4,932,451 | | 6/1990 | Williams et al. . |
| 4,932,849 | | 6/1990 | Scheffer . |
| 4,938,272 | | 7/1990 | Sandy, Jr. et al. . |
| 5,012,954 | * | 5/1991 | Will ................................... 152/415 X |
| 5,094,263 | | 3/1992 | Hurrell, II et al. . |
| 5,645,100 | | 7/1997 | Chuang et al. . |
| 5,762,095 | | 6/1998 | Gapinski et al. . |
| 5,778,923 | | 7/1998 | Marston . |
| 5,785,076 | | 7/1998 | You . |
| 5,819,781 | | 10/1998 | Wu . |

* cited by examiner 2A-2A

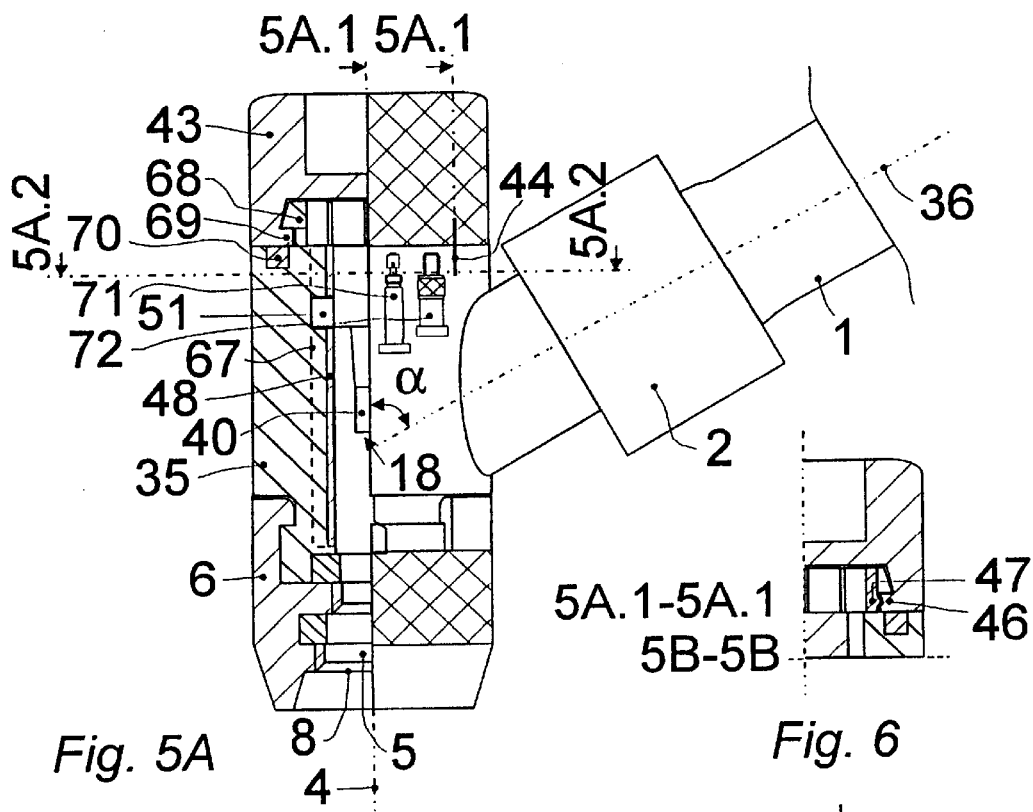
Fig. 5A
Fig. 6
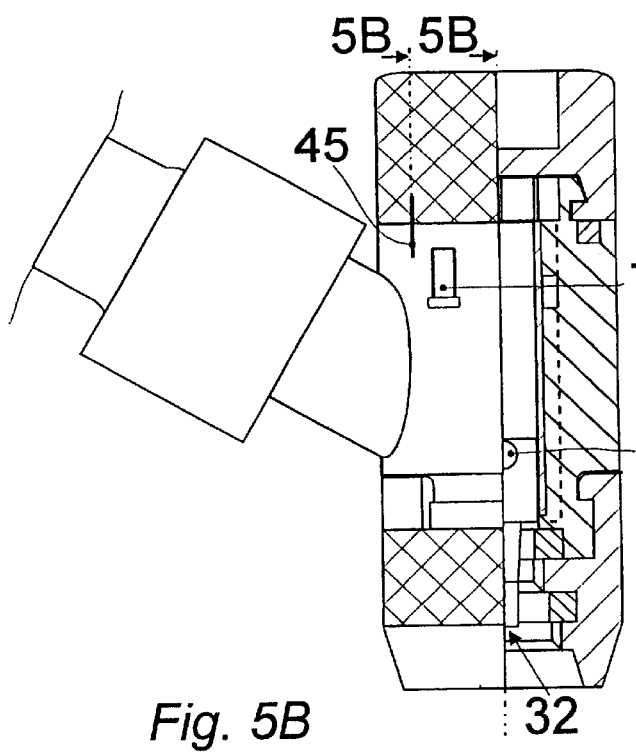
Fig. 5B
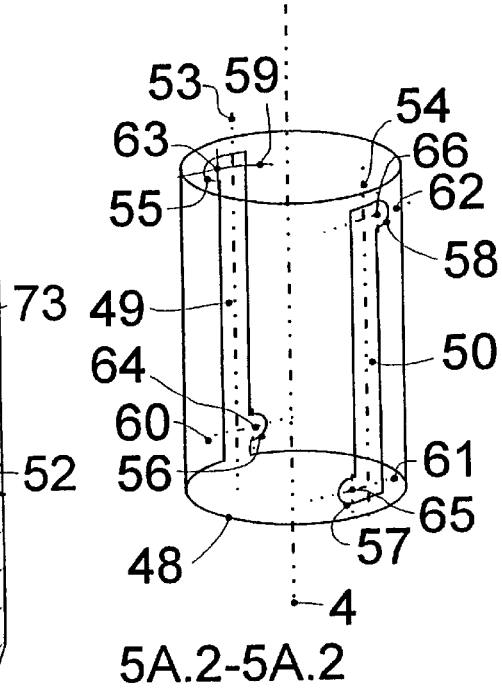
Fig. 7

12A-12A, 12B-12B

VALVE CONNECTOR

This is a Continuation-in-Part of PCT/DK96/00055 application filed Feb. 2, 1996.

TECHNICAL FIELD

The invention concerns a valve connector for inflation through varying valves of vehicle types.

For reasons of clarity, some of the standards used will be cited. In the ISO standard No. 10475:1992(E). thread for tyre inflation valves of vehicles is described. The most used threads are designated 5V2 (DIN: Vg 5,2), which has a nominal diameter of 5.2 mm and a pitch of 1.058 mm, and 8V1 (DIN: Va 8), which has a nominal diameter of 7.7 mm and a pitch of 0.794 mm respectively. These thread types are used in the valve types of Dunlop-Woods, Sclaverand or Schrader. The last mentioned valve type is frequently used on common cars. where a spring-loaded pin head in the valve core must be kept down in preparation of the passage of air, while pumping a tyre. For this purpose, the valve connector must be equipped with suitable means which can serve this aim. Moreover, suitable means, e.g. a contra valve or the like, must be used to ensure a that loss of air is avoided when activating the valve core pin. The Sclaverand valve has—just like the Dunlop-Woods valve—the distinctive character that its core pin is solely opened by air pressure. The necessary air pressure for opening a Sclaverand valve is up to 16 bar, and the valve is mostly used in connection with high-pressure tyres with a pressure of up to 16 bar. The opening pressure for the Dunlop-Woods valve is approximately 4 bar, which ensures that it is easier to open.

It is commonly known from mechanical engineering, that when connecting a nut to a thread the axial length of the thread $T_N$ for a nut N is $\geq 0,8\times$ the outer diameter $D_N$ of the corresponding screw, i.e. $T_N \geq 0,8 \times D_n$. This rule of thumb is used for highly-loaded constructions, where the thread is fastened with a wrench.

BACKGROUND OF THE INVENTION

Well-known valve connectors (e.g. GB-B-977,139) can only be connected to to the Dunlop-Woods valve type and/or the Sclaverand valve type, or the Schrader valve type.

A well-known connector for a Schrader valve is of the type, where a rubber cylinder is tightly squeezed against the stem by means of a lever, which axially compresses the rubber cylinder. Consequently, the rubber cylinder is squeezed radially against the stem. With reference to different valve diameters, it is necessary that auxiliary equipment (nut 6) is screwed onto or out of the valve thread to reduce or increase the internal diameter in advance to ensure the establishment of a connection from the valve connector to other valve diameters. Loose parts can disappear and can be loosened when used, if the pump hose is turned, so that the connection is no longer air-tight. The disadvantage of this connector type is that the user has to apply much strength when using the lever. It is necessary to use both hands to stabilize the (dis)connection.

GB-B-15 99 304 shows a universal valve connector which can be screwed on all valve types. The thread (4) corresponding to 8V1 also keeps the bushing (26) in position. The bushing (26) has an internal thread (30) corresponding to 5V2 for Sclaverand or Dunlop-Woods valves. The core pin of the Schrader valve is opened mechanically by means of a stationary pin indicated with (12). The disadvantage of this connector type is that the bushing (26) with a 5V2 thread has to be removed before connecting to a Schrader valve, and also that the bushing (26) must be mounted again before connecting to a Dunlop-Woods or Sclaverand valve. Also in this case loose parts are used. They can disappear and loosen when used, if the pump hose is turned, resulting in an untight connection.

From DE-B 38 19 771, an universal connector on a handpump with two coupling holes is known: one for Dunlop-Woods and Sclaverand valves and one for Schrader valves of which the core pin is opened mechanically. The disadvantage of this wave of coupling is firstly, that it cannot be fastened to a valve and secondly, that it can only be used in a certain position. where the coupling hole is turned almost vertically upwards, and finally that the user has to find out which of the two holes to use for the valve in question. This prior art has. therefore, no interest, when it is essential, that the user can use the coupling without studying the type of valve, the user instructions. and decide which type of valve should be used and thereafter turn the wheel with the valve to a cor rect, upright position for the valve coupling in question.

From U.S. Pat. No. 2,025,067 a coupling is known, where tubes of different diameters can be coupled to matching diameters in a tube. This prior art is intended for tightening against pipes without threads, and the axial displacement of each sealing is not decisive. This kind of coupling is meant for a tank filling device. The gaskets used for sealing the adaptor are basically mushroom-shaped with the stem of the mushroom arranged between trapezoidal walls in the adaptor, thereby leaving a semi-circular sealing to tighten against the nozzles without threads. Using a threaded tube in such a gasket would destroy the gasket after few connections.

Another well-known universal valve type, which, apparently, does not exist in the patent literature, is of the same type as the one of the above mentioned GB-B-15 99 304. This rubber cylinder consists of two adjacent parts of different diameter and length, fitting on 5V2 , and 8V1 threads, respectively. Axially, proximally staggered on the centre line of the holes it is possible to mount a means, which can open the core pin of a Schrader valve. The disadvantage of coupling is partly that both hands must be used to stabilize the (dis)-connection of the relevant valve types and partly that the rubber cylinder must be taken out of the housing and turned upside down to make connection to valves with different thread types possible, so that the coupling place for connecting the valve is always positioned closest to the opening of the coupling hole. Also, the pin which mechanically opens the Schrader valve has to be turned in the above-mentioned operation. This is a problem for the ordinary user, as both means must be positioned correctly in relation to each other in order to be able to connect the coupling to a valve: combinatorily, there are to four possibilities to select from, which can only be done correctly if a user manual is available. Apart from that, the above-mentioned means can be lost. loosened or disappear in the said operation.

From WO-A-92/22448 it is known to provide a sealing means, which is placed in a single level, and from GB-B-977 139 a valve connector operated by a lever cam is known. Common to both prior art references is that they can only be used together with a Schrader valve, and that neither Sclaverand type nor Dunlop-Woods type valves can be served by this type of connector, as the sealing means only show one diameter fitting e.g. the Schrader valve.

THE OBJECT OF THE INVENTION

Inflating a tyre is a problem to many people, especially if the tyres have different valve types, and only one pump has to be used. This is the case in most house-holds. The aim of the invention is to provide a valve connector which fits on all current valve types, which is easy to operate, is economical, and which has the possibility of automatically adjusts itself to the valve in question. Also, it should be possible to use the connector with existing pumps.

According to the invention this task is solved by means of the provisions in the characterising part of claim 1.

By a connector for inflation valves of vehicle tyres, where the connector consists of a housing connected to a pressure source, preferably a hand or foot pump, and with a coupling hole with a diameter corresponding to the diameter of the valve to which it is connected, where the coupling hole is equipped with a securing means for securing on the valve and sealing means against valves of different sizes, the invention is provided by the fact that the sealing means are positioned coaxially in the housing behind the coupling hole and are established in at least two parallel discrete levels with the centre line of the housing as their normal, where the sealing means' inner diameter approximately correspond to the outer diameter of the current valve size to which the coupling is connected, when used, that the sealing means which is closest to the opening of the coupling hole in the housing has the largest inner diameter, whereas the sealing means farthest from the opening of the coupling hole in the housing has the smallest inner diameter, and the diameters between the extremes are in corresponding discrete distances between these extremes. The coupling place on a valve, which is to be connected, is positioned against a sealing surface on the sealing means in the coupling hole of the concerned valve. The connector has only one coupling hole. The use of it is therefore simple, even without a user manual. and loose nipples are superfluous. Therefore, a connection can always be established in only one operation.

In an appropriate embodiment of the invention, it is suggested that the securing means is a rotational bushing mounted on the housing, which is equipped with a thread in the coupling hole, which fits on the respective valves, and which is sealed with the sealing means against the connector housing, which is farthest from the coupling hole in the connector housing The connector can be positioned here on the valve with an airtight connection. which does not become untight, when the connected hose is turned. In addition, mounting is quickly accomplished without applying significant strength. (Dis)-Connecting of the coupling can be done using only one hand.

To reduce the wear of the gasket seal surface in the connector housing and also to reduce the force by means of which the rotational bushing has to be turned, and furthermore to ensure a reliable sealing against valves with 5V2 thread, a still more appropriate embodiment suggests that the innermost thread is provided by a bushing with a 5V2 thread, where the bushing is embedded and—slightly—axially sliding in a taper milling in the rotational coupling bushing and is coupled rotational-free to the coupling bushing by means of a set of ribs, which are distributed around the bushing circumference, and which are geared into corresponding grooves in the coupling bushing, and that the sealing means rests on a stepped milling. This ensures that frictional forces do not occur between the gasket seal and the coupling bushing during the main part of its fastening and unscrewing, whereas the coupling bushing is pulling the connector housing and its gasket seal against the valve when tightening Tightening occurs against the core of the valve thread and is stabilized as a result of the reduced radius of the inner part of the gasket seal.

In order to be able to use the valve connector on a Sclaverand type valve, which is not standardized, i.e. some of the threads are removed thereby forming two parallel secants on each side of the Sclaverand type valve, a further development of the inner bushing is suggested, whereby the inner bushing is running in an undercut grove in the valve housing. Such Sclaverand type valve can not tighten against the sealing means, and the pressurized air will try to escape through the secant openings. By running in the undercut grove the bushing will tighten against this when mounting the valve connector on the valve.

In connection with the (dis)connection with only one hand the connector is provided by means of temporary thread, i.e. created by squeezing e.g. a rubber cylinder against the existing valve thread of which the securing means and sealing means in a well-known way consist of the bushing of a deformable material positioned in the housing, preferably a rubber type material shaped like a "H", and that a piston is mounted proximally to the valve and the rubber bushing which has two extremes to establish an axial compression and release of the rubber bushing, and also a lever for activating the piston, where the axis of the lever is placed perpendicularly to the centre line and concentrical with this, and that the lever for activating the piston is turned from a position forming an angle $\Psi$ with the centre line to a position almost perpendicular to the centre line, where a locking means of the lever is working together with a corresponding locking means of the housing, whereby the locking means of to the lever, as an example, is provided in the construction of the lever. In a special advantageous embodiment a reaction arm is applied to absorb the reaction forces originating from the movement of the lever arm between the two positions. This measure ensures a reliable securing and a simple operation.

With this embodiment of the connector, it is possible to mount same using just one hand, as the lever is taken down to its locking position by just a simple squeezing of the lever and the reaction arm parallel to the hose connection on the connector housing. By this action the piston is pressed against the rubber bushing, which is tightly squeezed radially against the concerned valve.

In an improved embodiment of the valve connector, the rubber bushing is provided with at the least one external V-shaped incision in the circumference perpendicular to the center axis close to those parts squeezing against the threads of the valve. Through such incisions the rubber bushing is predetermined to excerpt the largest radial force against the thread exactly where the incisions are and the user of the valve connector will experience a soft working lever arm. In order to support this purpose further and securing the valve connector on the valve even under high pressures it is suggested, that a preferably torroidal shaped ring is arranged in the incisions, thereby stressing the excerted radial forces.

Figures 4A, 4B:
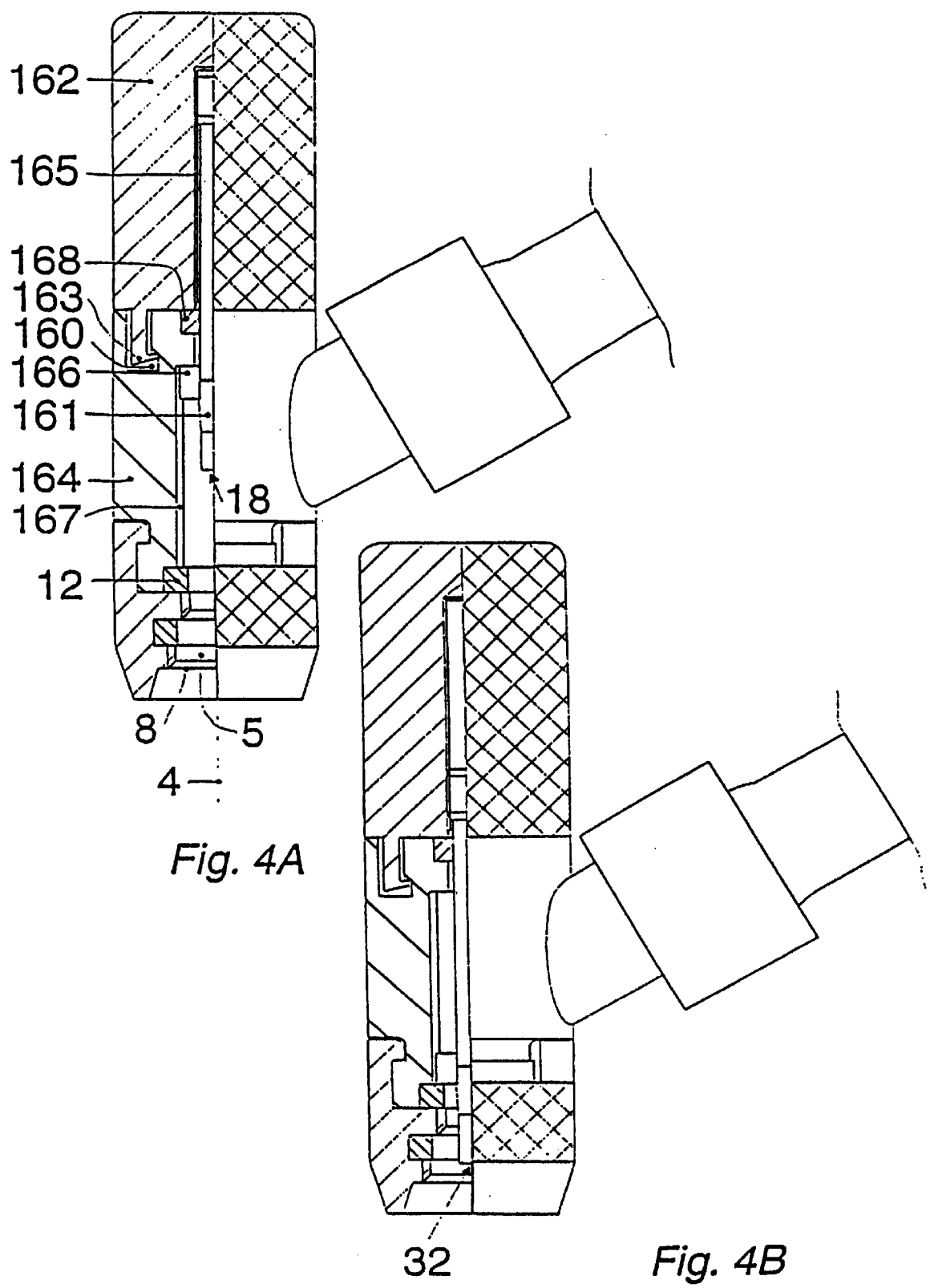

The embodiment with the lever arm is designated: a bending-moment-free (dis)-connection as the valve may not carry any bending-moment by the (dis)-connection. Connection to almost all valves is possible, as such connector type might be able to open a core pin in such Schrader valve, which is opening at an air pressure of approximately 5–6 bar. The air pressure in the pump hose is of the same magnitude as when a high-pressure tyre provided with a Sclaverand valve is inflated. This is optimally achieved by using a high-pressure hand or foot-operated bicycle pump. There are core pin types which cannot be opened by means of air pressure of an ordinary bicycle pump (e.g. 10 bar max.). Connecting can be done easily and comfortably in two ways. Either the last mentioned core type is being replaced with the first mentioned one and the embodiments or the invention without a pin are being used as a connector, or the core can—according to an appropriate embodiment of the invention—be opened by a pin placed in continuation of and coaxially to the centre line of the connector housing, which is transported by axial shifting from a position farthest from the valve (FIG. 4A) to activate the central pin head of the core (FIG. 4B). By this embodiment the necessary pumping force is considerably lower. when a Schrader valve is to be inflated, because no air pressure is used for to opening the valve. Inflation can therefore be done with an ordinary bicycle pump.

As a means for automatic sliding the activating pin in the housing from a passive to an active position, the activating pin is constructed as a piston equipped with a suitable securing means and a piston rod, which can slide in is the cylinder shaped housing, and which, without any physical load, is held in a sealing longitudinal position against the cylinder wall, so that the sliding of the piston after the connection of the valve connector occurs by means of the compressed air which is transported from the pressure source, and so that the piston in the position farthest from the wheel valve seals less than 100% against the cylinder wall.

With a valve connector according to claim 1 equipped with such automatic sliding activating pin it is possible to mount the valve connector equipped with a valve to a compressor hose, which can be available to the public known. e.g. from bicycle shops, etc. There, it is not necessary to fasten the valve connector to the valve, as the user excerts the pressure necessary to secure an airtight connection.

With such valve connector, inflating tyres without the user having to identify the valve type and functioning has become possible. The operation conveniency has also increased significantly, and it will now be easier for the user to inflate the tyre to the correct pressure, which in general eases the driving and reduces tyre abrasion. At the same time, a contra valve function is added to the Schrader valves in that the valve only opens the core of the Schrader valve when sufficient air pressure is fed from the pressure source and air thus cannot escape from the tyre during inflation.

In an appropriate embodiment of the valve connector according to the invention, it is suggested that the piston is constructed with a central, axially sliding valve, which is elastically pressed to a closing position against the piston top. This provides a well-defined opening zone, which is not influenced by abrasion in the piston guide, and the increasing opening of the core secures the passage of compressed air from the pressure source as well.

As an example, the central, axially sliding valve on the piston can in a suitable way be activated by the fact that the piston valve is levered with a valve lever, which reaches eccentricity through the piston, and by the fact that a spring between the piston and its valve keeps the valve closed when the piston does not influence the core in the wheel valve.

Alternatively, the piston valve can be levered with a core pin which concentricly reaches axially through the piston, where a spring leads it to a position distally from the piston. It has thus become possible to provide the piston with a reliable function within the limits established by the ISO standard, as the piston with the core pin automatically adjusts its length to the limits of the valve in question.

The latter embodiments ensure a safe functioning of the valve lever, because it is enclosed and only influenced by axially directed forces. Also, the bridge on the Schrader valve can be used for activating the piston valve. Further, the reaction forces from the piston is led to the air and not to the mechanical constructions.

The Schrader valve has the biggest major diameter of the external thread (thread type ISO 4570/3 8V1, ISO 10475:1992-12V1 resp.) and the coupling place is closest to the opening of the coupling hole. The Dunlop-Woods cores and the Sclaverand valves have the same thread type, where the major diameter of the external thread (thread type ISO 4570/2 5V2) is smaller than the minor diameter of internal thread 8V1. Therefore, it is possible that the Dunlop-Woods core type and the Sclaverand valve type can pass both the coupling place of 8V1 threads and 12V1 threads. Consequently, the coupling place of the connecting of 5V2 thread is farthest from the opening of the coupling hole. The 5V2 thread of the Dunlop-Woods core (both the type which is DIN normed and the type which in daily language is called the 'ball valve'), is sufficiently sticking out over the nut 8V1 which is keeping the core to the stem and of which the major diameter is less than the minor diameter of the internal thread for the 12V1 thread in the bushing. There is, therefore, enough space for at least two thread types each with a corresponding seal ring. The same applies for the squeezing connections, according to the invention, where the connector is squeezed to form a temporary thread. The said 8V1 nut cannot pass the coupling place of the Schrader valve. That is due to the fact that the major diameter of the said nut is bigger than the diameter of the biggest hole in the rubber cylinder (a major diameter of external thread 8V1). The beginning of the coupling place of the 5V2 thread is at distance a from the opening of the coupling hole. As the load on the connection is low, it is not necessary to use the entire length of the internal thread, as generally accepted rules say 0.8× of the size of the coupled external thread. This rule is based on mechanical constructions which are high-loaded and where the thread is fastened by a wrench. It is therefore possible that the coupling place of the 5V2 thread is behind the coupling place of the 8V1 thread.

The invention can exist in a number of embodiments which will appear from from the dependent claims.

SPECIFICATION OF THE DRAWINGS

Figure 2A:
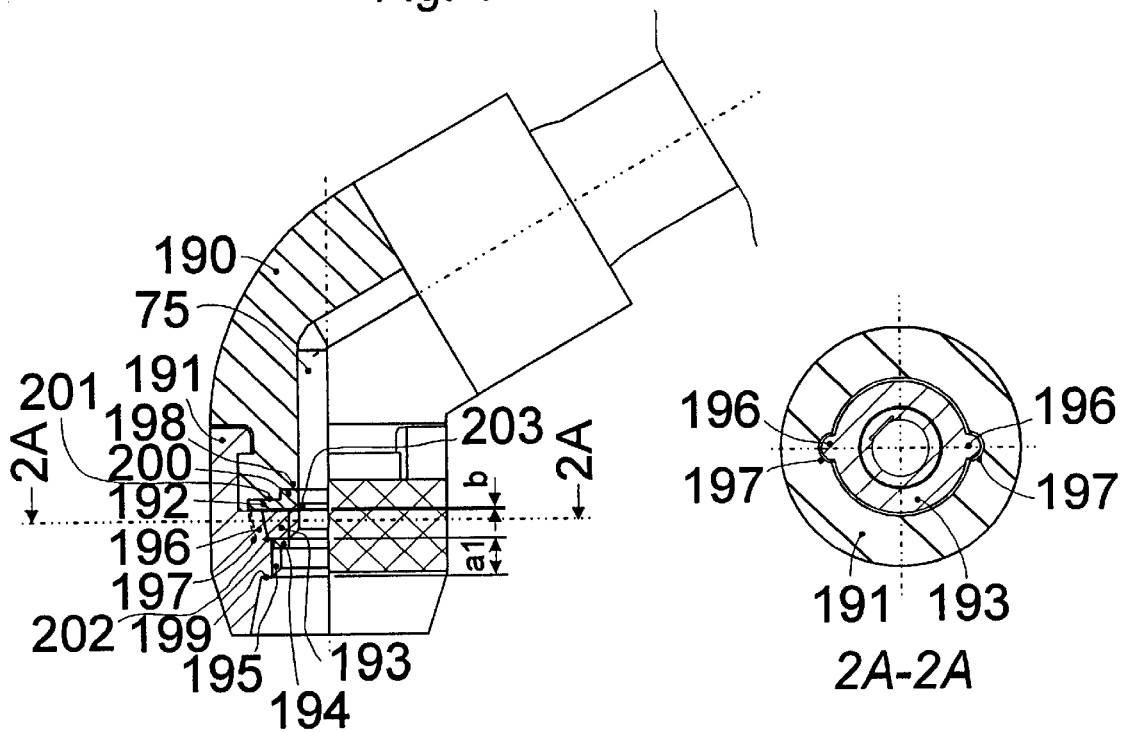
Figure 2B:
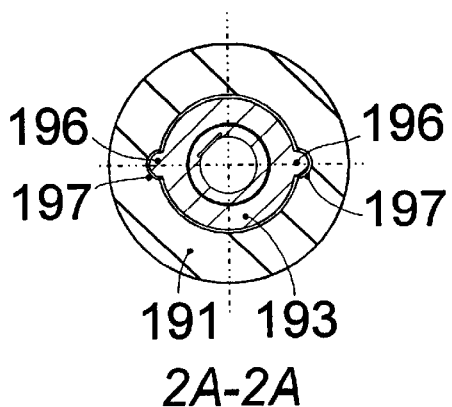
Figure 3:
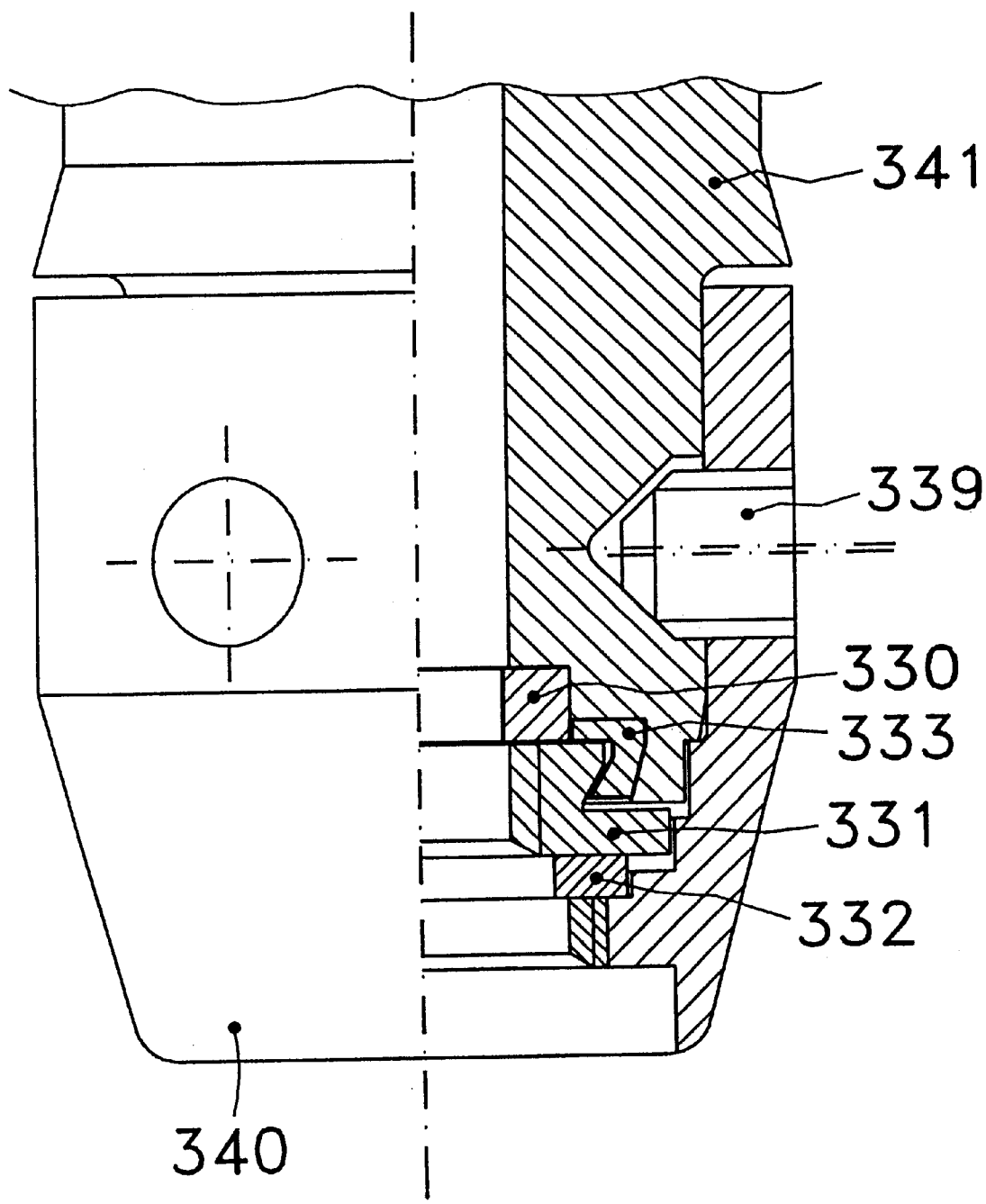

The invention is explained in details below by means of drawings. The drawing shows in:

FIG. 1 the universal connector in the first embodiment connected to the hose of a (high-pressure) foot pump, where the connector is screwed on the valve and a Schrader valve type can be opened by air pressure;

FIG. 2A the connector according to FIG. 1 in a second embodiment where the bushing with 5V2 thread and a gasket sealing for Schrader can slide parallel to the centre line;

FIG. 2B a rendering details of the connector according to FIG. 2A, (section 2A—2A);

FIG. 3 the connector according to FIG. 2 in a third embodiment designed to be used on a Sclaverand valve, which is not according to the ISO-standard;

FIGS. 4A, B universal connector according to FIG. 1 in a fourth embodiment where the coupling is screwed on the valve, and a Schrader valve can be opened mechanically by means of a pin, where the pin feed mechanism is constructed with a thread and where the pin is shown in the top and bottom position, respectively;

FIGS. 5A, B universal connector according to FIGS. 4A, 4B in a fifth embodiment, where the pin feed mechanism is constructed with a big thread pitch, and where the pin is shown in the top and bottom position, respectively;

FIG. 6 a rendering of details of the connector according to FIG. 5A (section 5A. 1—5A.2) and FIG. 5B, (section 5B—5B);

FIG. 7 feed cylinder of the embodiment according to FIG. 5A, 5B, (section 5A.2—5A.2)

Figure 8:
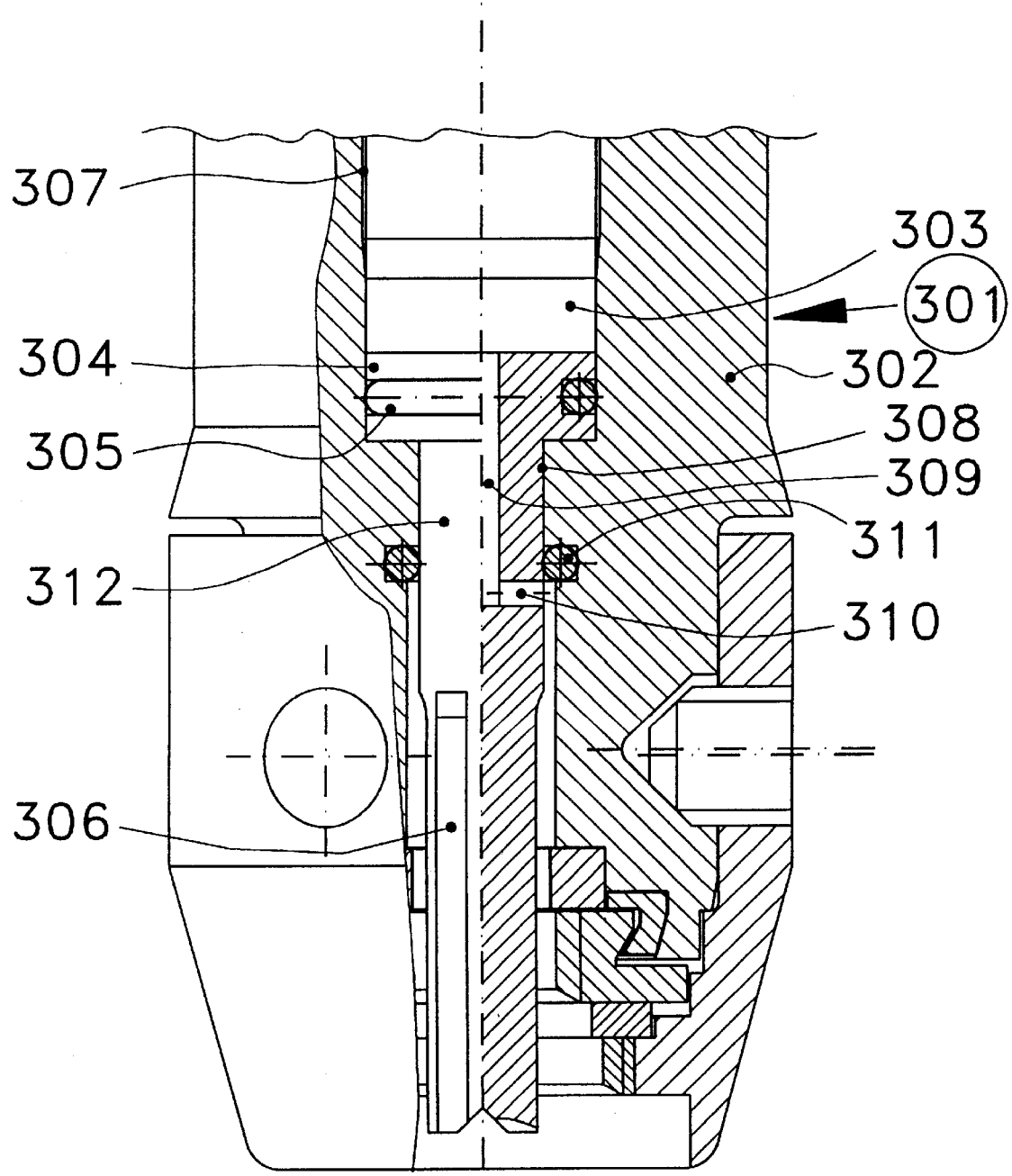

FIG. 8 a valve connector according to FIG. 1 in a sixth embodiment, where the coupling is screwed on the valve, and a Schrader valve can be opened automatically by means of a pin being a piston, where the piston is shown in its distal position, where pressurized air can pass through the piston being also a control valve.

Figure 9:
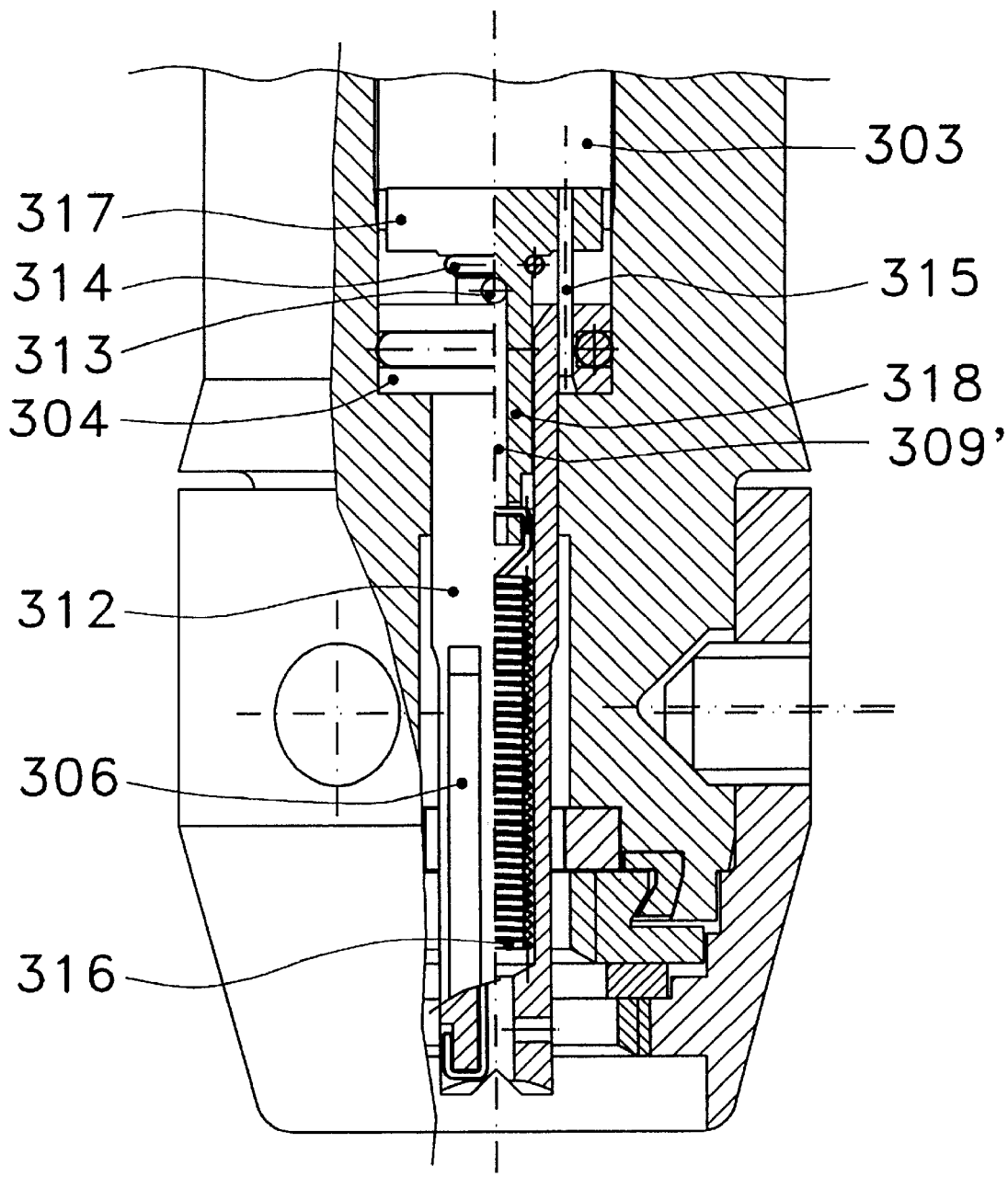
Figure 10:
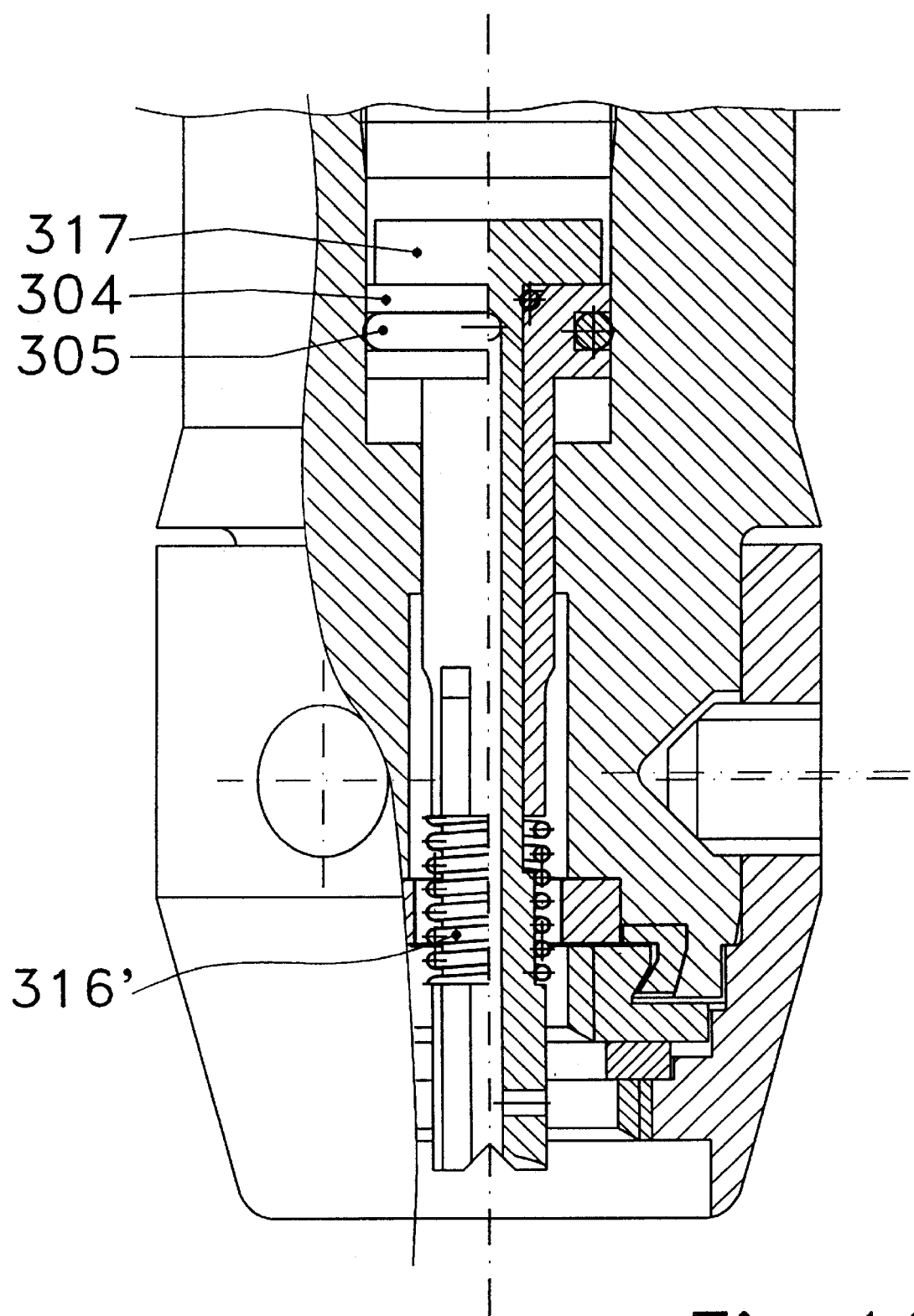
Figure 11:
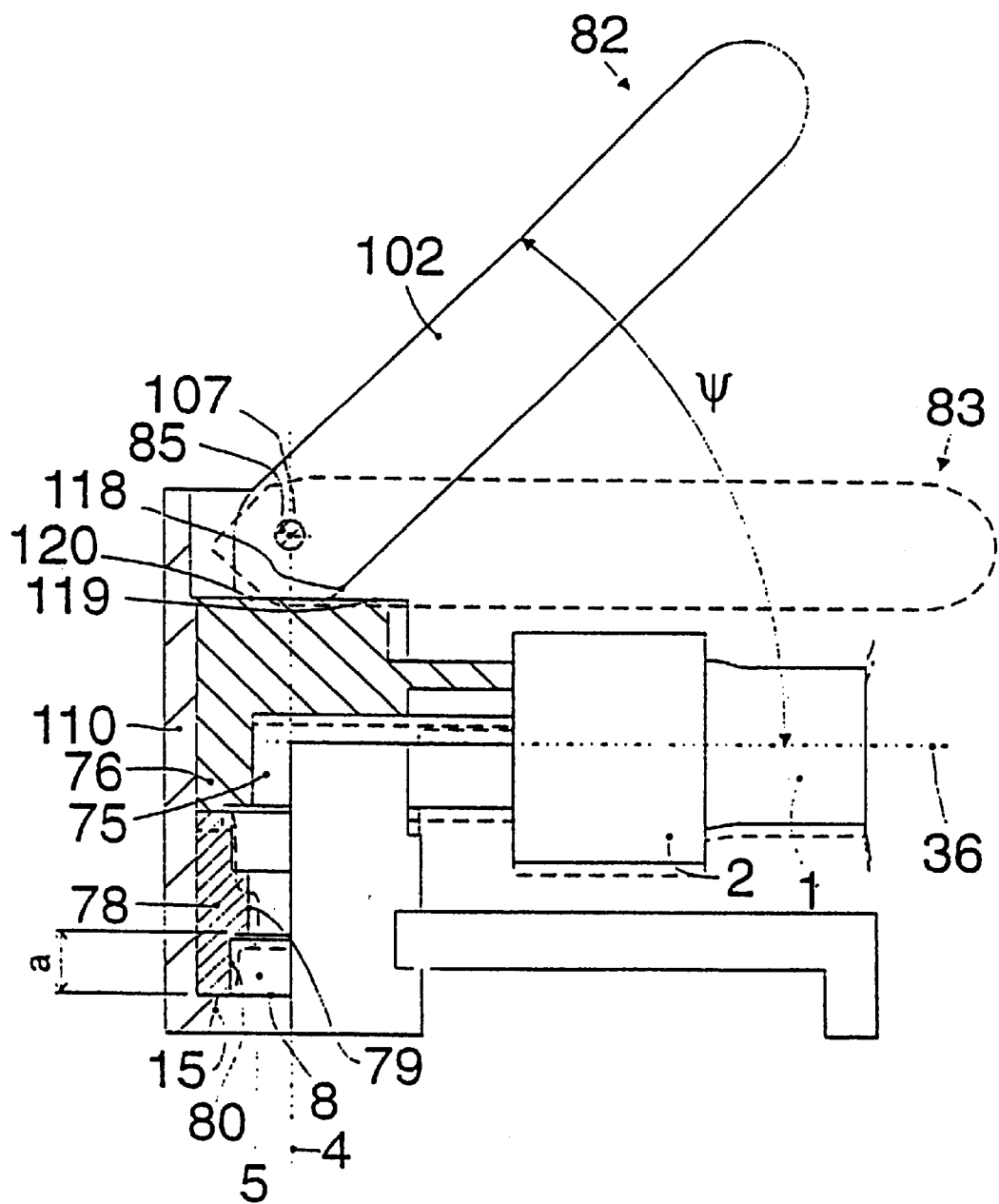
Figures 12A, 12C:
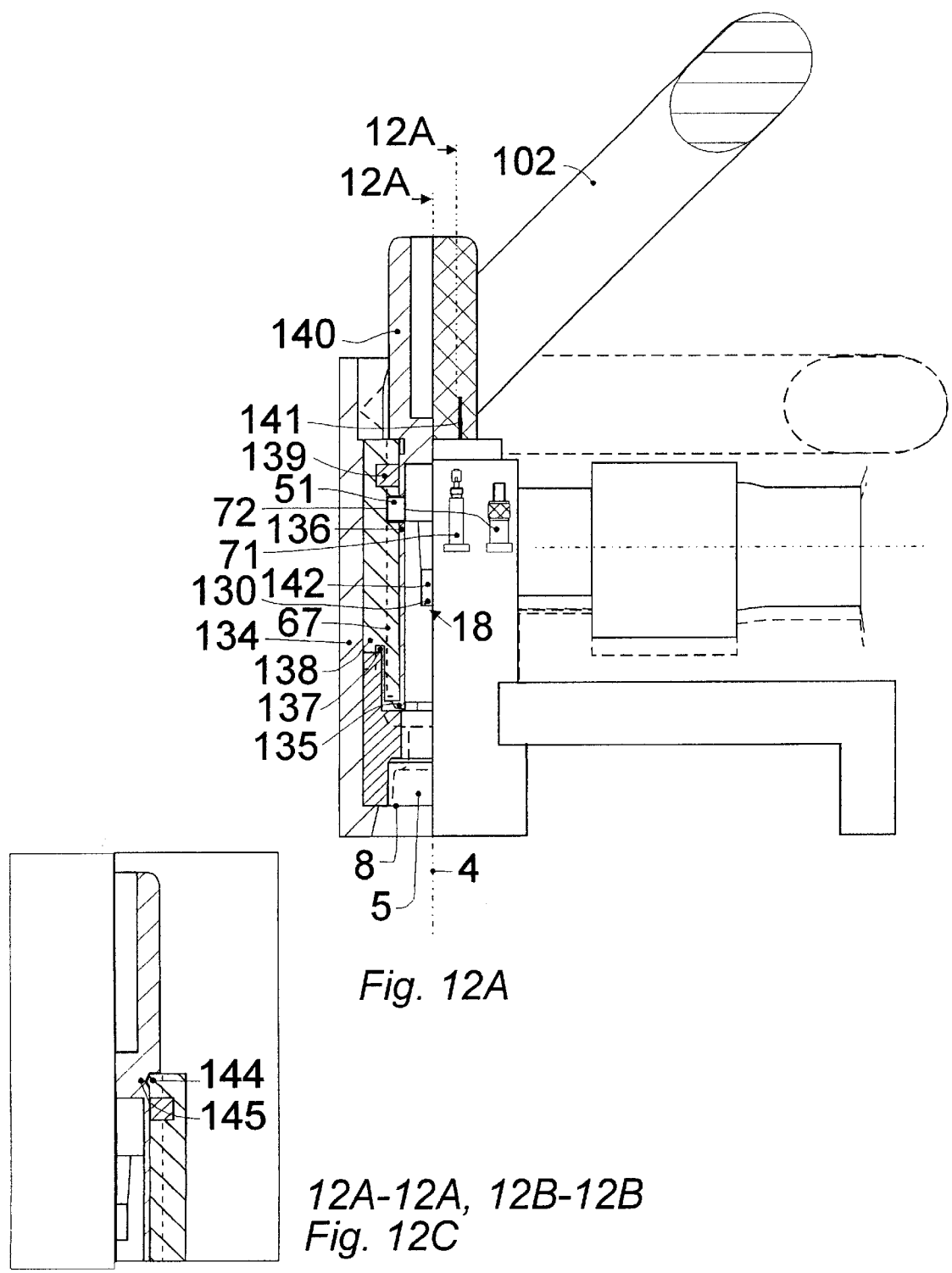
Figure 12B:
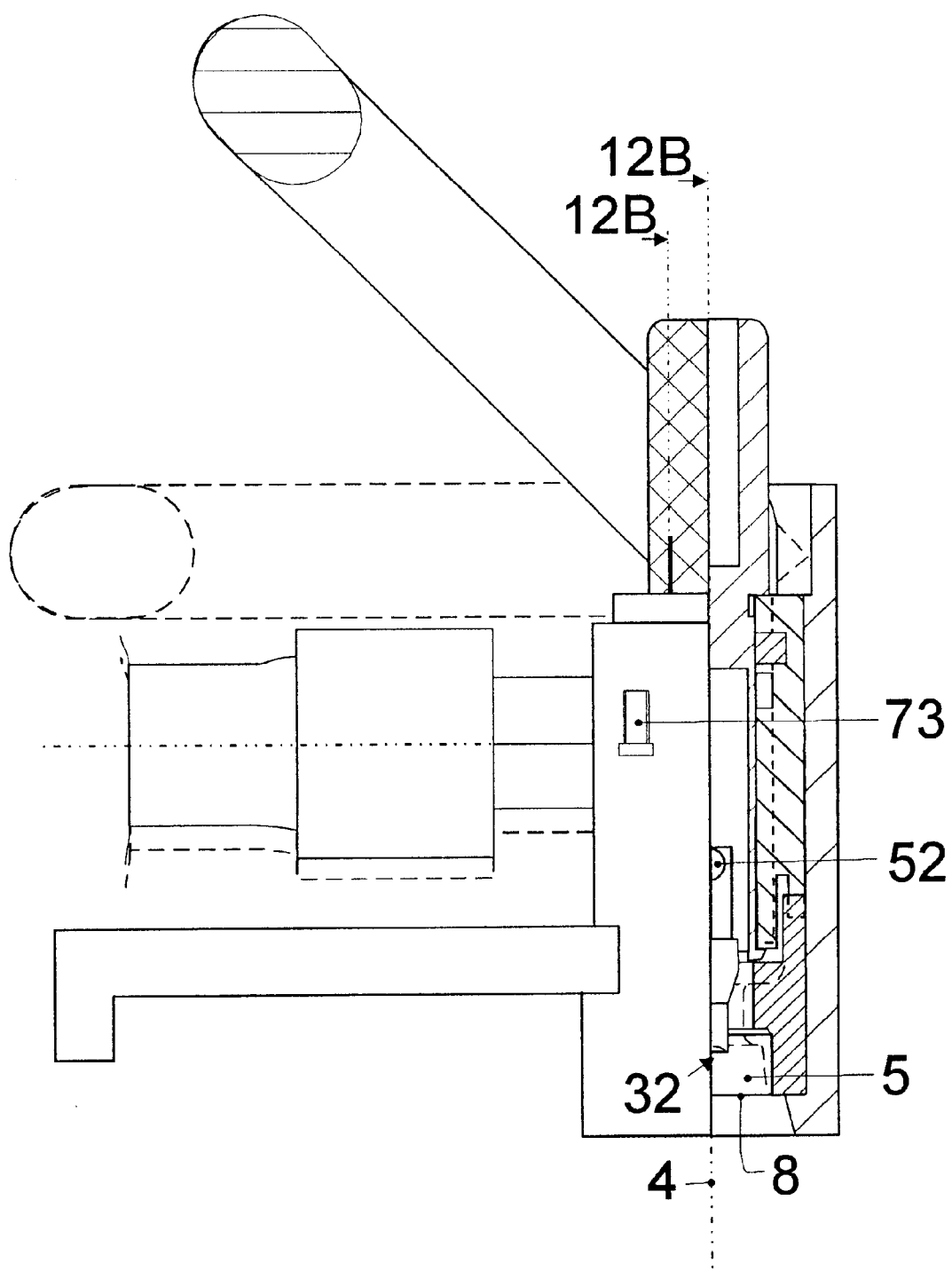

FIG. 9 a valve connector according to FIG. 8 is a seventh embodiment, where the piston is equipped with a valve which is levered by an excentric valve lever;

FIG. 10 another connector in an eight embodiment, where the piston is equipped with a valve which is levered by a concentric valve lever; the piston is shown in a position on the way to the core of a Schrader valve, where the valve on top of the piston is closed;

FIG. 11 universal connector in a ninth embodiment connected to a hose of a (high-pressure) foot pump, where the connector is squeezed on the valve and a Schrader valve can be opened by means of air pressure;

FIGS. 12A,B universal connector in a tenth embodiment, which is a further development of the embodiment of FIG. 5, where the coupling is connected to a hose of a foot pump, and where the coupling is squeezed on the valve, and a Schrader valve can be opened mechanically by means of a movable pin, which is in the top and bottom position, respectively;

FIG. 12C section 12A—12A according to FIG. 12A resp. section 12B—12B according to FIG. 12B—non-essential details are not shown.

Figure 13:
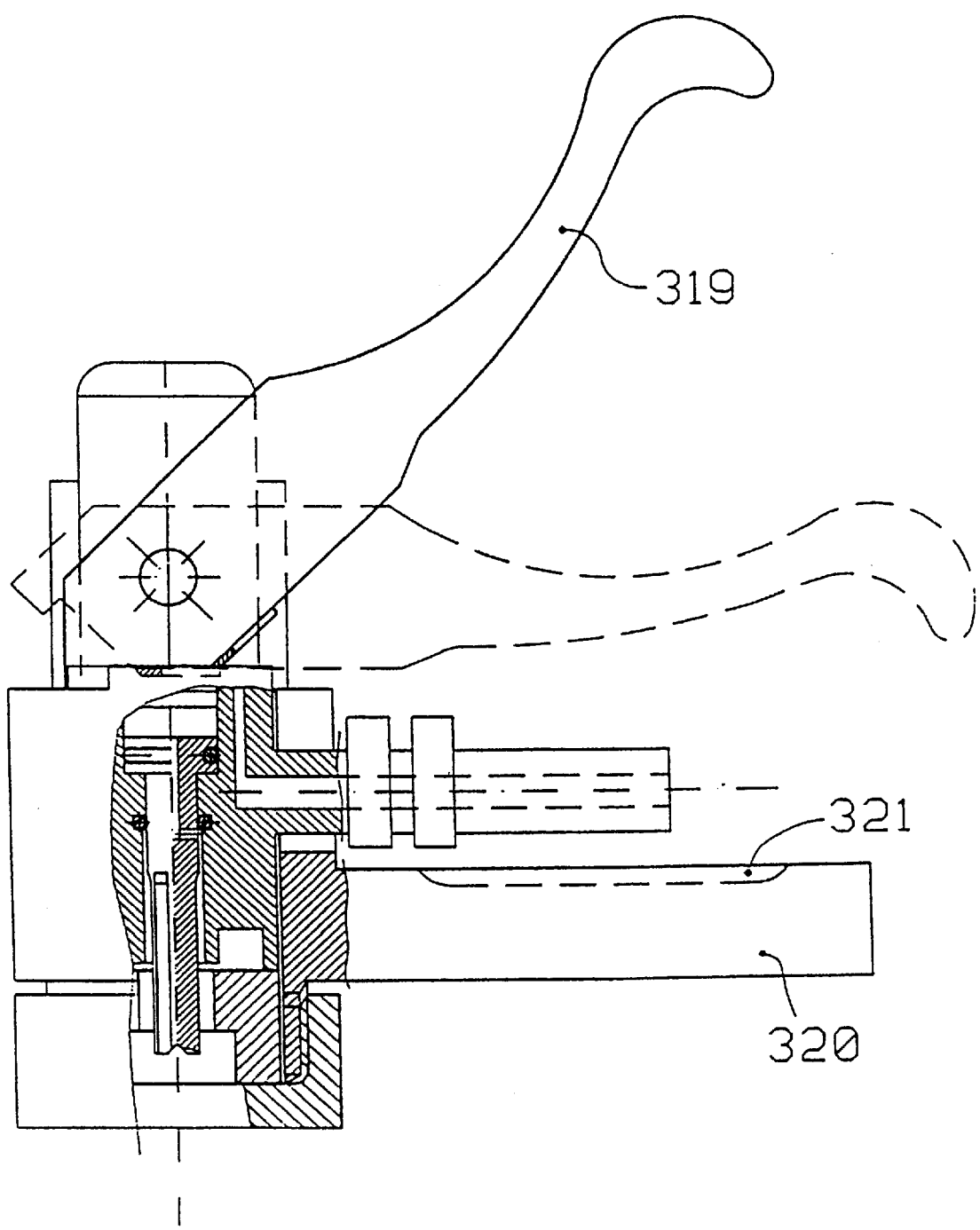
Figure 14:
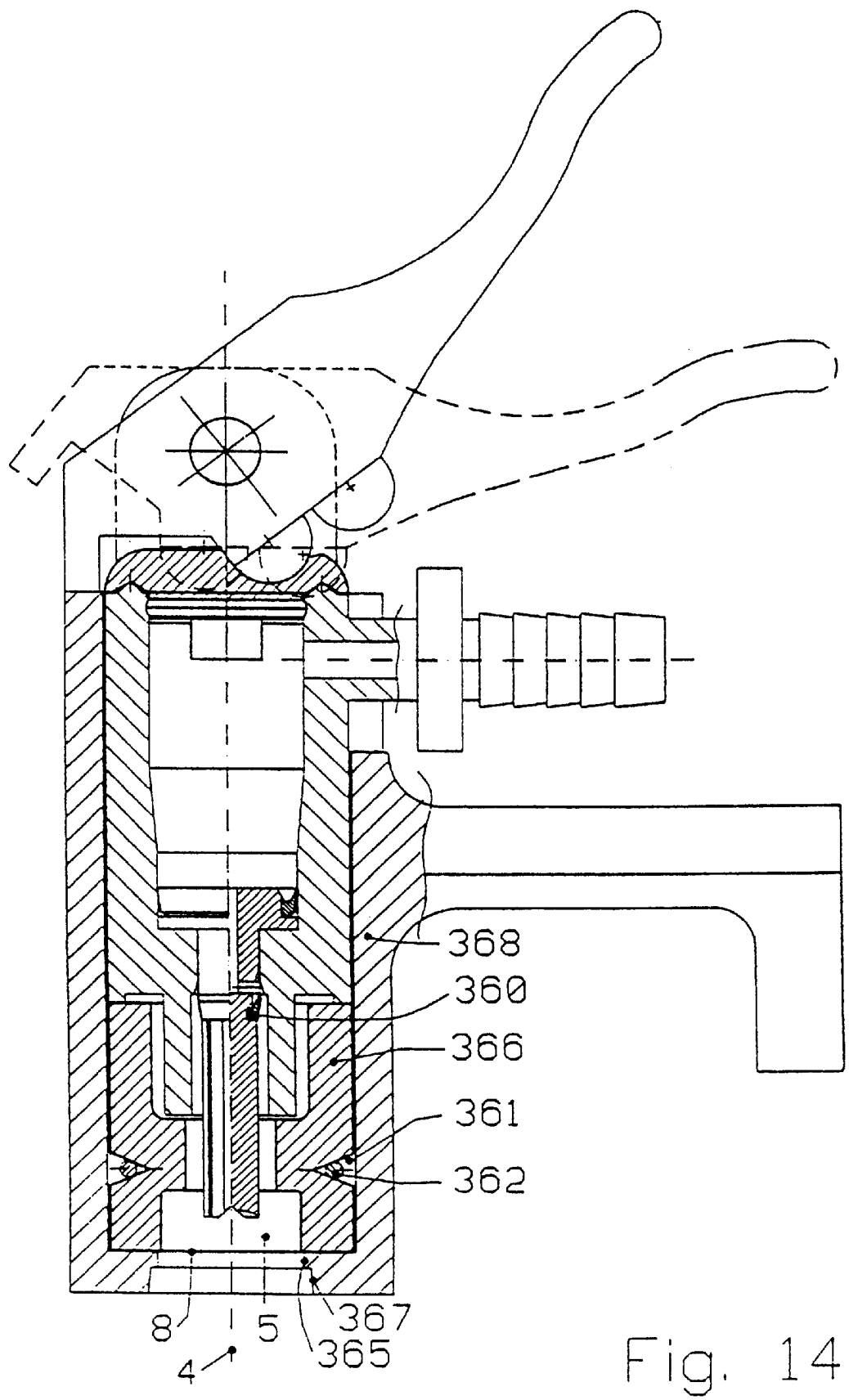
Figure 15:
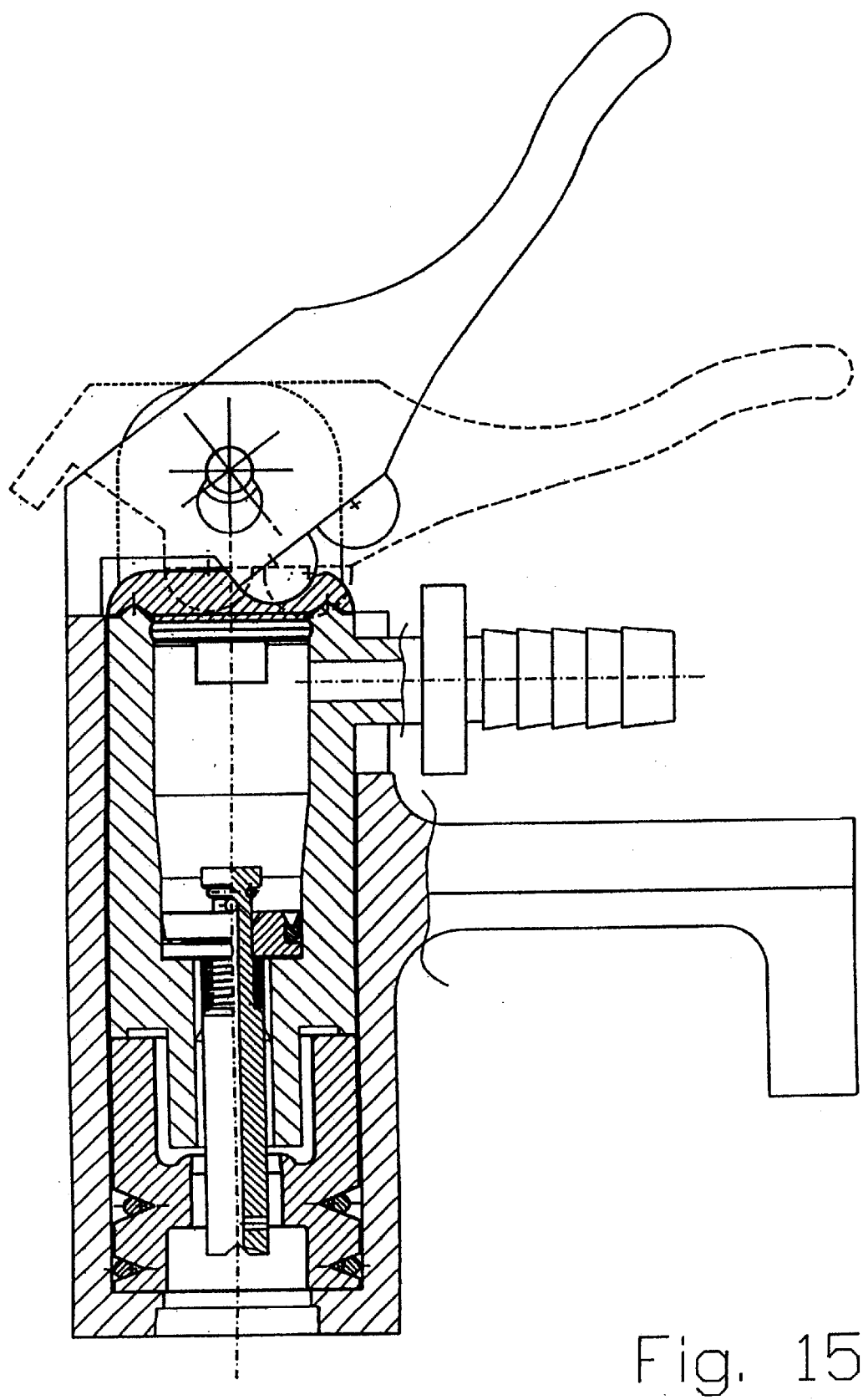
Figure 16:
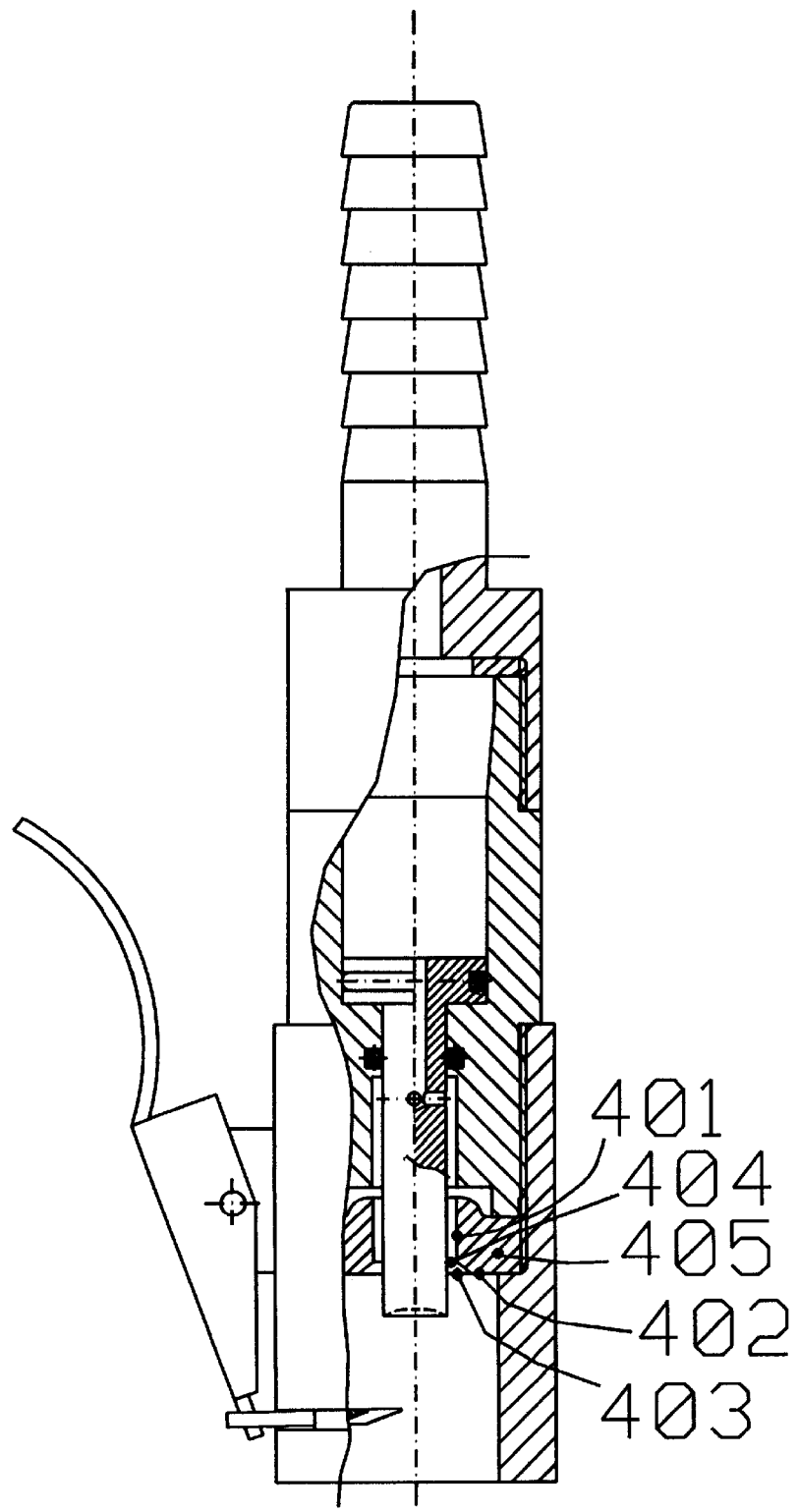
Figure 17:
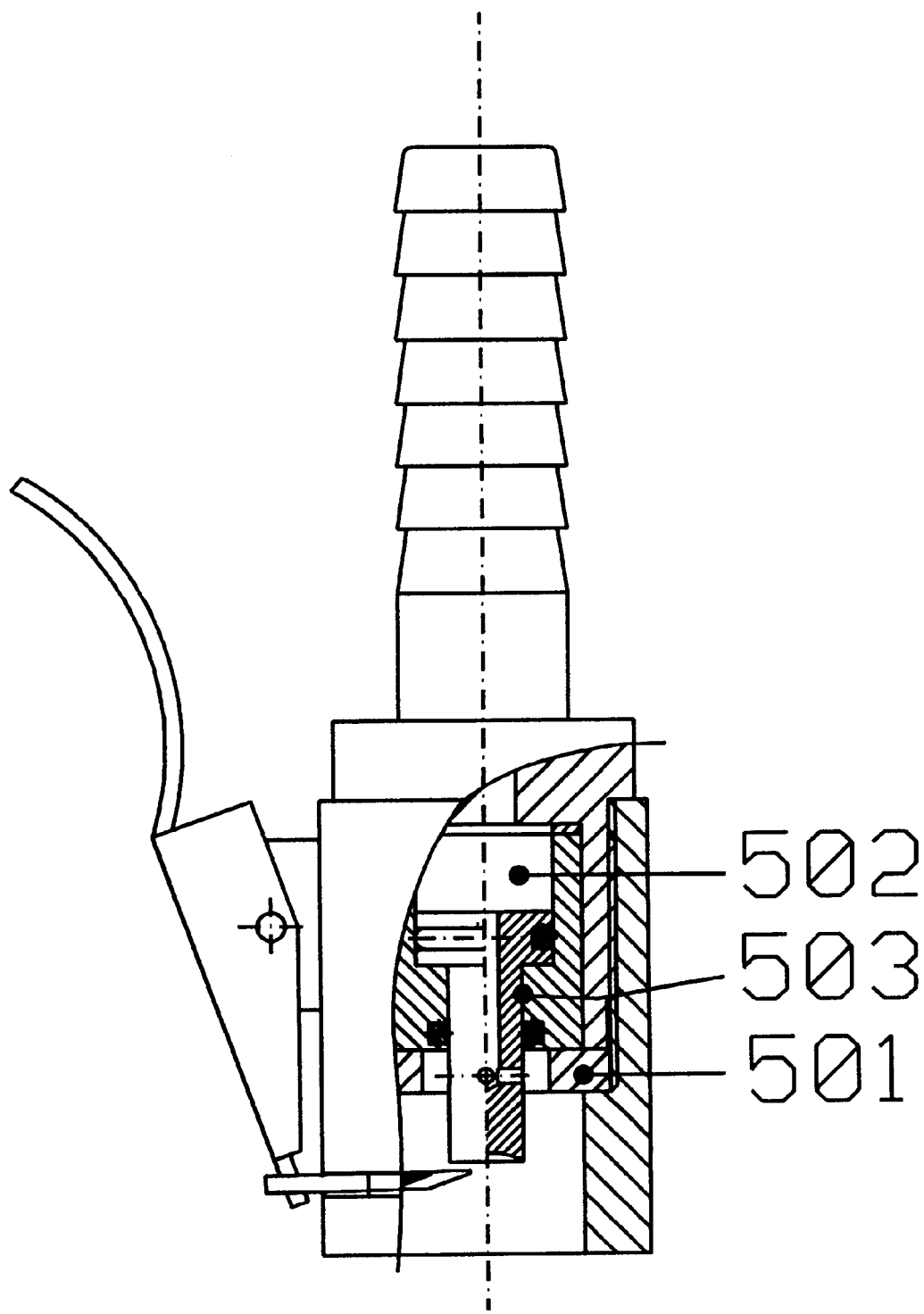

FIG. 13 universal connector in a special embodiment made for the purpose of being used in vehicle wheels with a narrow opening for the connector, where the connector is squeezed on the valve, and a Schrader valve is opened by means of the automatically movable pin;

FIG. 14 universal connector in a twelfth embodiment, where the coupling is squeezed on the valve using a rubber bushing with incisions and a torroid ring in each incision, and where a Schrader valve can be opened by means of the automatically movable pin, which is formed as a piston and is shown in the bottom position;

FIG. 15 universal connector in a thirteenth embodiment, where the coupling is squeezed on the valve using a rubber bushing with incisions and a torroid ring in each incision, where the coupling is squeezed on the valve, and a Schrader valve is opened by means of the automatically movable pin, which is formed as a piston with a control valve and is shown in the bottom position;

FIG. 16 the universal connector of FIG. 8, in a fourteenth embodiment, where the "clip-on" type securing means are used, where the valve connector is secured to the valve by means of a beak matching the threads of the valve, thereby establishing temporary threads;

FIG. 17 the connector of FIG. 16, in a fifteenth embodiment where the activation pin can be shorter.

DESCRIPTION OF PREFERRED EMBODIMENTS

In FIG. 1 the pump hose 1 is mounted on the housing 3 by means of the ring clamp 2. The housing 3 is bent in an angle of e.g. 30°–60° in relation to the centre line 4 of coupling hole 5. The bushing 6 is in the shown embodiment equipped with two ISO thread types: 5V2 thread 7 starting farthest from the opening 8 of the coupling hole 5 and 8V1 thread 9 starting at the abovementioned opening. At (dis-) connection, the bushing 6 is turned around and is kept in the grooves 11 of the housing 3 by means of grip-hooks 10. The gasket seals 12 and 13 are tightening against the thread types 5V2 and 8V1. The gasket seal 12 is also tightening the crossing 14 between the housing 3 and the bushing 6 when the connector is used on a Schrader valve. The underside of the bushing 6 is equipped with a taper 15.

FIG. 2A shows a second embodiment. The housing 190 is equipped with a coupling bushing 191, which freely and without friction can turn around the housing 190 because of the small space b between the sealing means 192 and the bushing 193 together with the connector bushing 191. The gasket seal 194 for the Schrader valve is placed freely in the connector bushing 191, on the thread 8V1 195. The bushing 193 with the 5V2 thread is unattached but axially moveable in a taper milling 202 in connector bushing 191. Both can be shifted parallel with the centre line of the valve. The sealing means 200 is embedded in a stepped milling 201 in the housing 190 with an external part 192, which is also tightening the crossing between the housing 190 and the connector bushing 191. The bushing 193 can turn together with the connector bushing 191 as it is equipped with at least two ribs 196 which fit into corresponding grooves 19, (FIG. 2B) in the connector bushing 191. When a Dunlop-Woods or Sclaverand valve is connected, the sealing means 200 is tightening on the minor diameter of the valve thread. The valve is stopped at the edge 198, so that the nut of the Dunlop-Woods valve is not fastening itself on the underside 199 of the 8V1 thread. At the top, the sealing means 200 has a radially stepped, reduced diameter.

FIG. 3 presents another connector designed to be used on a Sclaverand to valve, which is not according to the ISO-standard. In such valve some of the threads are removed thereby forming two parallel secants on each side of the Sclaverand type valve. Such Sclaverand type valve can not tighten against the sealing means 330 of the above mentioned valve connectors, as the pressurized air will try to escape through the secant openings. The bushing 340 is fastened to the housing 341 by means of detachable locking means 339, reaching into an external grove on the housing 341 perpendicular to the center axis. The internal sealing means 330 and the external sealing means 333 are arranged between the coupling bushing 331 and the housing 341 resp. the bushing 340. The coupling bushing 331 tightens against the undercut grove in the housing 341 assisted by another sealing means 333 fitting into the undercut grove. When mounting the valve connector on the valve, the coupling bushing is running in the undercut grove in the valve housing, and if Sclaverand type valve can not tighten against the sealing means 330, the air will move, into the space between the coupling bushing 331 and the other sealing means 333.

FIG, 4A and 4B show the connector according to FIG, 1, where the pin 161 is built-in in the knob 162, which is kept in a groove 160 of the housing 164 by means of grip-hooks 163. The knob 162 is equipped with internal thread 165 with a large Pitch. When the knob 162 is turned around, the pin 161 is shifted axially on the centre line 4 of the opening 3 of the coupling hole 5, as the pin 161 is equipped with fins 166 running in slits 167 of this hole 5. Sealing is cone with one gasket seal 168. The knob 162 is made of e.g. elastic material. The pin 161 is shown in FIG. 4A in the top position 18 and in FIG. 4B in the bottom position 32.

In FIG. 5A–7 the pump hose 1 is connected to the housing 35 by means of 35 the ring clamp 2. The angle a between the centre line 36 of the ring clamp 2 and the centre line 4 of the opening 8 of the coupling hole 5 is e.g. 30°–60°. The bushing 6 with internal thread and gasket seals is identical to that of FIG. 1. The pin 40 can move along the centre line 4 of the coupling hole 5 from position 18 to position 32, when the knob 43 is turned from position 44 (FIG. 5A) to position 45 (FIG. 5B) and vice versa. On the underside, the knob 43 is equipped with radially internal, rotating jut 46 surrounding a corresponding bulb 47, and it is locked pivotally in position 44 and 45 when the knob 43 catches the bulb 47: see section 5A.1—5A.1 (FIG. 6). The cylinder 48 is directly connected to the knob 43. In the cylinder 48 there are two slits 49, 50 of which one 49 is open on the opposite side of the knob 43. The two round protrusions 51, 52 of the pin 40 are moving diametrically opposite each other in the slits 49, 50. At both ends, the slits 49, 50 with the centre lines 53, 54, which are parallel to the centre line 4, have two slits 55, 56, 57, 58, which are placed diametrically opposite each other, where the centre lines 59, 60, 61, 62 lie perpendicularly to the centre lines 53, 54. The slits 55, 56, 57, 58 end in a half circle, of which the centre 63, 64, 65, 66 lies slightly further from the closest side of the slits 49, 50 than the radius of the protrusions 51, 52. Moreover, the protrusions 51, 52 are moving in the internal thread 67 from the coupling hole 5. The thread pitch 67 is so large that the turning knob 43 only has to turn approx. 240° from position 44 to 45 or reversed. When the knob 43 is turned, the slits 49, 50, 55, 56, 57, 58 push the protrusions 51, 52 in the thread 67. The turning knob 43 is fastened on the housing 35 by means of grips 68, which are moving behind an internal jut 69 in the knob. The above-mentioned construction becomes air-tight by means of a gasket seal 70 at the top of the housing 35. On the sides of the housing 35 at the positions 44 and 45 there are symbols 71, 72, 73 of the valve types which can be connected.

In FIG. 8 a section of a valve connector according to the invention is shown in a partial longitudinal section, where the piston 304 is shown in its distal position, in which it presses the core of a Schrader valve to be completely open. In this way, air from the pressure source can pass through the cylinder 303 and e.g. through an central blind drilling 309 positioned axially in the piston 304 and in the piston rod 317, which ends in the piston rod 312 at a branched, radially directed drilling 310, which ends on the other side of a piston control 308 sealed with e.g. an O-ring 311. This arrangement of the drillings ensures a maximum pressure on the piston for the opening of the core of the Schrader valve, after which an opening for air pressure is provided when the core of the Schrader valve is almost entirely open. The piston 304 itself is sealed with another O-ring 305 against the cylinder wall 303, which at an appropriate distance corresponding to at least the stroke of a core of a Schrader valve above the distal piston position is equipped with means 307 for reduction of the sealing. This arrangement is applied in order to make it possible for the air to pass the piston 304 when it is proximally displaced at the application of the valve connector on other valves than Schrader type valves. In this position, the piston rod 312 is also displaced so much from the distal position that the blind drilling 310 is positioned above the sealed part of the cylinder wall 303. The distal part of the piston rod 312 is constantly guided in the piston control 308. and in order to lead air to the valve in question, the piston rod 312 is here equipped with longitudinal air ducts 306. which allow the air to pass the piston rod 312 past the sealed piston control 308 with the sealing means 311.

FIG. 9 show another embodiment of the valve connector according to this invention in a partial longitudinal section, where the piston 304 is equipped with a valve 317 which is levered by an excentric valve lever 315. Here the piston valve 317 is placed on top of the piston 304, where it has a central core pin 318 on the lower side, which at the passage to the valve has partly a radially directed blind drilling 313 and partly an O-ring 314, which provides sealing between the valve 317 and the piston 304. The radially directed blind drilling 313 ends in a central, axially directed blind drilling 309', which goes through the core pin 318 from the blind drilling 313 away from the valve 317. At the distal end of the core pin 318 an extension spring 316 is secured at the distal end of the valve rod 312 and pull to close the valve 317, when this is not subjected to other forces. When the piston 304 is moving in the cylinder 303, piston 304 and valve 317 are concomitant. The valve 317 can be opened when the piston comes closer to its distal position, where a valve lever 315 is stopped by a terminal surface in the cylinder 303. This stops the concomitant movement of piston 304 and valve 317, and then first the sealing 314 and then shortly afterwards the blind drilling 313 are levered above the piston 304. This makes it possible for the compressed air above the piston 304 to escape through the blind drillings 313 and 309'. The compressed air is then led to the core of the Schrader valve which is by now completely open.

FIG. 10 shows another embodiment of the valve connector according to this invention in a partial longitudinal section, where the piston 304 is equipped with a valve 317, which is levered by a concentric valve lever, which here makes up the core pin. The very valve 317 on the piston 304 is constructed as in FIG. 9, and thus not described any further. The piston 304 is shown in a position on its way to the core of a Schrader valve, where the valve 317 on top of the piston 304 is closed. The valve is opened when the core pin 318 depresses the core of the Schrader valve, whereby this is opened concurrently with the opening of the valve 317 itself. Through this. the spring 316' is squeezed together to such an extent that the core pin 318 always can adjust itself to different limits of the core of the Schrader valve.

In FIG. 11 the pump hose 1 is connected to the piston 76, which moves in the housing 110, by means of clamp ring 2. An elastic body 78 with coupling surfaces 79 (for the Dunlop-Woods and the Sclaverand valve) and 80 (for the Schrader valve) is compressed by the movable piston 76 by means of a lever 102, which is pressed down from the top position 82 to the position 83, where it is parallel with the centre line 36 of the ringclamp 2. The lever 102 turns around the axis 85 which is mounted in the housing 110 and to which the axis centre 107 is perpendicular and which intersects the centre line 4 of the opening 5 of the coupling hole 5. The coupling surface 79 lies at a distance 'a' from the opening 8 of the coupling hole 5, while the coupling surface 80 is adjacent to this. The area on the elastic means 78 bears against the piston 76. The piston air supply hole 75 has a diameter which is slightly smaller than the major diameter of the external thread 5V2, so that the Sclaverand valve has a natural stop at its connection. Thus the coupling place for the 5V2 thread is around the 5V2 thread.

When disconnecting, the lever 102 is released. It now automatically turns back to the rest position 82, because the elastic body 78 returns to the unstressed condition. This is possible because the distance of the surface 118 from the axis centre 10, is larger than the distance of the surface 120 of the lever 102 at the top 119 of piston 76. The turn of the lever 102 stops when the plane surface 120 of the lever 102 stops against the flat top 119 of the piston. The top of the lever 102 is in rest position 82 under an angle $\Psi$ of approx. 45° with the centre line 36 of the ring clamp 2. At the opening 8 of the coupling hole 5, the housing 110 is equipped with a cone 15 which facilitates the mounting of the universal connector.

FIG. 12A. 12B, 12C show the embodiment which is a combination of the connector of FIG. 11 and the construction of the pin of FIG. 5A and FIG. 5B. In FIG. 12A, the pin 142 is shown in its top 18 position and in FIG. 12B in its bottom 32 position. The construction of pin 142 and the way it works is the same as in FIG. 5, except that it is mounted on piston 138 by means of an edge 135 on the lower 35 end of the cylinder 136. The construction of the pin becomes air-tight by means of a gasket seal 139 between the piston 138 and the cylinder 136. The turning knob 140 is equipped with a line 141 indicating the knob 110 position. The valve corresponds to the position 32 of the pin 142 resp. The turning knob 140 is fixed at the valve symbols 71, 72, 73 when the piston fits in a recess 145 (FIG. 12C) in the knob 140 with a bulb 144: see section 12A—12A in FIG. 12A and section 12B—12B in FIG. 12B, resp. Here too, the opening 8 of the coupling hole 5 has the centre line 4.

FIG. 13 shows an universal connector in a special embodiment made for the purpose of being used in vehicle wheels with a narrow opening for the connector, where the connector is squeezed on the valve, and a Schrader valve is opened by means of the automatically moveable pin. In order to ease the use, the lever arm 319 has a special shape, and in the reaction arm 320 there is made to a grove 321 for the pressure hose.

FIG. 14 shows an universal connector in an embodiment, where the coupling is squeezed on the valve using a rubber bushing 366 with an incision 361 and a torroid ring 362 in the incision, and where a Schrader valve can be opened by means of the automatically movable pin, which is formed as a piston and is shown in the bottom position. In order to avoid transfer of momentum forces to the vehicle valve, the surface 367 can be slightly cone shaped. The incision 361 weaken the rubber bushing 366 at the place shown, which causes the rubber bushing to squeeze the threads on the valve precisely where it is most convenient. When, further, torroid rings are arranged in the incisions, the force excerted on the valve threads are increased.

FIG. 15 shows an universal connector in an embodiment like the one in FIG. 14, but where the automatically movable pin is self adjusting to production tolerances of the core of the Schrader valves.

FIG. 16 shows still another embodiment to be used in connection with the well known "clip-on"-type securing means. The reference numbers of FIG. 8 shall, where the items are not different, be valid for the items in FIG. 16. The valve connector is here secured to a valve by means of the known "beak" matching the threads of the valve, thereby establishing a temporary threads.

When the valve connector is connected, the activation pin will function as explained in connection with FIG. 8. If a valve with a 5V2 thread is to be connected, it is important, that the orifices of the inner opening 404 of the sealing means 405 has a shape of a truncated cone in order to guide the threads of the valve. When mounted, the 5V2-valve is sealed by the sealing surface 401 and e.g. the 8V1 is sealed by the sealing surface 402. This embodiment could also with a washer-type sealing means be used for a Schrader valve only.

In this case only the cylindrical space 502 just above the activation pin is necessary and the activation pin can be shorter, as the piston control 503 is positioned adjacent to the sealing means 501, as shown in FIG. 17.

The various embodiments described above are provided by way of illustration only and should not be construed to limit the invention. Those skilled in the art will readily recognize various modifications, changes, and combinations of elements which may be made to the present invention without strictly following the exemplary embodiments and applications illustrated and described herein, and without departing from the true spirit and scope of the present invention.

What is claimed is:

1. A valve connector for connecting to inflation valves of vehicle tires, the valve connector comprising:

a housing connected to a pressure source, the housing comprising a female coupling portion having a central axis and an inner diameter approximately corresponding to the outer diameter of the inflation valve to which the valve connector is to be connected, wherein the female coupling portion has at least one securing thread for securing the valve connector onto the inflation valve;

an inflation valve sealing means for sealing the valve connector onto inflation valves of various types and/or sizes, wherein said sealing means comprises a first portion and a second portion, the valve connector further comprising a bushing rotatably and permanently attached to the housing and configured to allow rotation around the central axis, said bushing sealed to the housing by said second portion of the inflation valve seal such that coupling movement of the inflation valve terminates at the second portion of the inflation valve seal and/or the housing, said bushing also containing said securing thread and said first portion of the inflation valve seal.

* * * * *